United States Patent
Kelch et al.

(10) Patent No.: US 12,116,316 B2
(45) Date of Patent: Oct. 15, 2024

(54) SLAG-CONTAINING POLYMER CONCRETE AND GROUTING MORTAR

(71) Applicant: SIKA TECHNOLOGY AG, Baar (CH)

(72) Inventors: Steffen Kelch, Oberengstringen (CH); Tim Mamie, Zürich (CH); Thomas Moser, Zürich (CH); Ulf Velten, Oetwil an der Limmat (CH); Fabio Würmli, Baar (CH)

(73) Assignee: SIKA TECHNOLOGY AG, Baar (CH)

( * ) Notice: Subject to any disclaimer, the term of this patent is extended or adjusted under 35 U.S.C. 154(b) by 411 days.

(21) Appl. No.: 17/614,482

(22) PCT Filed: May 28, 2020

(86) PCT No.: PCT/EP2020/064821
§ 371 (c)(1),
(2) Date: Nov. 26, 2021

(87) PCT Pub. No.: WO2020/239900
PCT Pub. Date: Dec. 3, 2020

(65) Prior Publication Data
US 2022/0227669 A1    Jul. 21, 2022

(30) Foreign Application Priority Data
May 28, 2019   (EP) ..................... 19177000

(51) Int. Cl.
C04B 26/16    (2006.01)
C04B 14/06    (2006.01)
(Continued)

(52) U.S. Cl.
CPC .............. *C04B 26/16* (2013.01); *C04B 14/06* (2013.01); *C04B 14/28* (2013.01); *C04B 18/142* (2013.01);
(Continued)

(58) Field of Classification Search
CPC ......... C04B 26/16; C04B 14/06; C04B 14/28; C04B 18/142; C04B 20/1003;
(Continued)

(56) References Cited

U.S. PATENT DOCUMENTS

2017/0121918 A1    5/2017   Yan et al.

FOREIGN PATENT DOCUMENTS

| CN | 107265965 A | 10/2017 |
| EP | 0 786 439 A1 | 7/1997 |

(Continued)

OTHER PUBLICATIONS

"Chalk, Prepared", Hawley's Condensed Chemical Dictionary, Mar. 15, 2007, Wiley Online Library, https://onlinelibrary.wiley.com/doi/10.1002/9780470114735.hawley03321 (Year: 2007).*

(Continued)

*Primary Examiner* — Robert S Jones, Jr.
*Assistant Examiner* — Jaison P Thomas
(74) *Attorney, Agent, or Firm* — Oliff PLC

(57) ABSTRACT

A curable binder composition includes: a) at least one organic binder selected from the group made of a1) epoxy resins and curing agents for epoxy resins and a2) polyisocyanates and polyols, and b) at least 50% by weight of slag based on 100% by weight of the binder composition.

10 Claims, 1 Drawing Sheet

(51) Int. Cl.
- *C04B 14/28* (2006.01)
- *C04B 18/14* (2006.01)
- *C04B 20/10* (2006.01)
- *C04B 28/08* (2006.01)
- *C04B 103/30* (2006.01)
- *C04B 103/40* (2006.01)
- *C04B 111/00* (2006.01)
- *C04B 111/60* (2006.01)
- *C04B 111/70* (2006.01)
- *C04B 111/94* (2006.01)

(52) U.S. Cl.
CPC ........ *C04B 20/1003* (2013.01); *C04B 28/082* (2013.01); *C04B 2103/30* (2013.01); *C04B 2103/408* (2013.01); *C04B 2111/00482* (2013.01); *C04B 2111/00637* (2013.01); *C04B 2111/00689* (2013.01); *C04B 2111/60* (2013.01); *C04B 2111/70* (2013.01); *C04B 2111/94* (2013.01)

(58) Field of Classification Search
CPC .............. C04B 28/082; C04B 2103/30; C04B 2103/408; C04B 2111/00482; C04B 2111/00637; C04B 2111/00689; C04B 2111/60; C04B 2111/70; C04B 2111/94; C04B 2111/00663; C04B 2111/00715; C04B 2111/2023; C04B 2111/23; C04B 28/08; Y02W 30/91

See application file for complete search history.

(56) References Cited

FOREIGN PATENT DOCUMENTS

| | | | |
|---|---|---|---|
| EP | 3 339 343 | A1 | 6/2018 |
| EP | 3 415 544 | A1 | 12/2018 |
| GB | 2460707 | A | 12/2009 |
| JP | H09-030854 | A | 2/1997 |
| KR | 10-0941284 | B1 | 2/2010 |
| KR | 10-2011-0119899 | A | 11/2011 |
| KR | 10-1705893 | B1 | 2/2017 |
| WO | 2010/030048 | A1 | 3/2010 |

OTHER PUBLICATIONS

Aug. 17, 2020 Search Report issued in International Patent Application No. PCT/EP2020/064821.

Dec. 9, 2021 Notification of Transmittal of Translation of the International Preliminary Report on Patentability issued on Dec. 9, 2021 in International Patent Application No. PCT/EP2020/064821.

Xiaohong, He et al. "Copper Metallurgical Production Technology" Metallurgical Industry Press, pp. 13-15, 2017.

Aug. 5, 2022 Office Action issued in Chinese Patent Application No. 202080031983.9.

\* cited by examiner

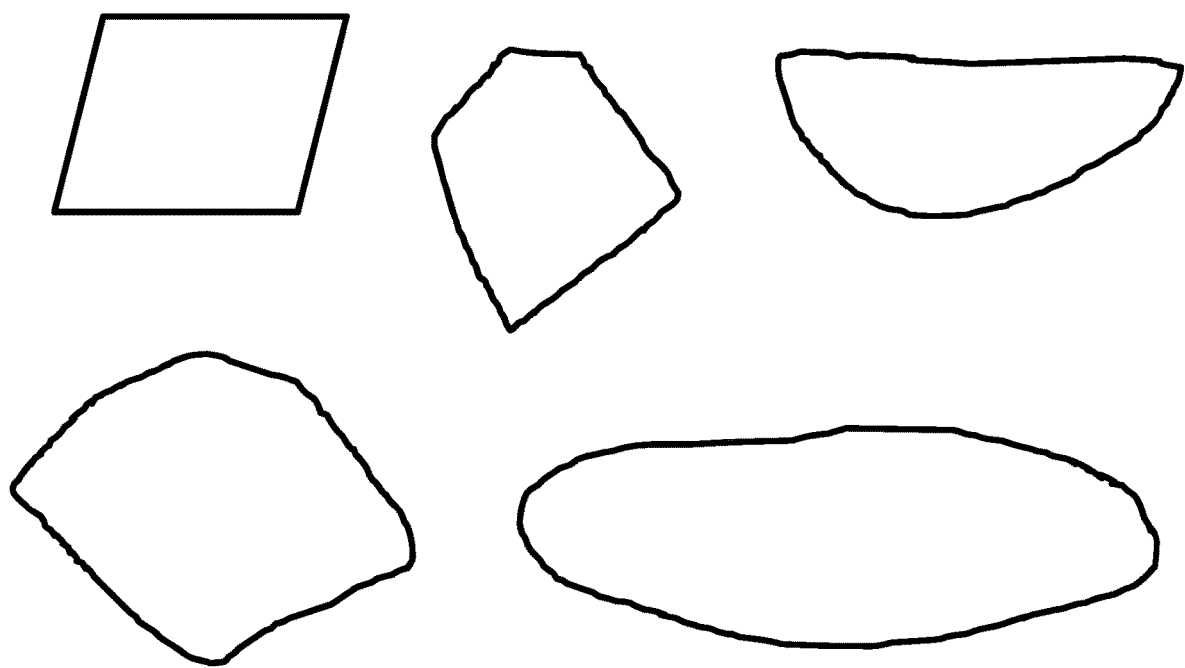

SLAG-CONTAINING POLYMER CONCRETE AND GROUTING MORTAR

TECHNICAL FIELD

The invention relates to the use of slag as filler in polymer concrete and polymer mortar.

STATE OF THE ART

Polymer concrete is a material impermeable to water that typically comprises an organic binder and fillers. Unlike normal concrete, in which the cement as binder holds the fillers together after hardening with water, in polymer concrete it is an organic polymer that acts as binder. Polymer concrete typically does not contain any cement as a binder. The filler in polymer concrete typically consists of natural rock, for example granite, quartz, basalt, limestone, expanded clay, perlite or other mineral raw materials, in varying grain sizes. Fillers are employed to alter the mechanical, electrical and/or processing properties of materials and at the same time to considerably reduce the proportion of the typically more costly matrix in the finished product. In addition, the presence of the filler grains ensures that the shrinkage in volume of the polymer concrete after curing of reactively crosslinking polymer matrices is significantly reduced and that the compressive strength thereof is increased.

The curable liquid organic binder, typically consisting of at least two components, is typically mixed with the filler after the binder components have been mixed, and then shaped and allowed to cure.

In epoxy-resin-based polymer concrete, the curable binder consists of a curable epoxy resin and a curing agent for the epoxy resin, which react after mixing to form a cured epoxy resin. In polyurethane-based polymer concrete, the curable binder consists of a polyisocyanate and a polyol mixture, which react after mixing to form a polyurethane. Epoxy resins and polyurethanes have the advantage over other organic binders, such as unsaturated polyester resins or acrylic resins for example, that they do not require peroxides and/or heat for curing. Peroxides are hazardous substances. Epoxy resins and curing agents are able to cure well even at cool temperatures, as are polyisocyanate and polyol. Polymer concretes based on epoxy resins or polyurethanes are characterized by high strength, frost resistance, abrasion resistance, and material resistance, and also by a closed and waterproof surface.

The growing demand for building materials, as well as environmental protection requirements, result in a shortage of natural raw materials capable of being used as fillers. This is true in particular of quartz sand and quartz gravel. There are therefore efforts to increasingly replace natural raw materials with industrial waste materials. An industrial waste material that occurs in large amounts around the world is slag. It occurs for example in the extraction of metals, in metal recycling or in the incineration of household waste or sewage sludge. Foundry sand, a glassy slag from iron production, is on account of its latent hydraulic properties used in finely ground form as an additive in cement and as a cement substitute. Other slags, such as steel slag for example formed in steel production or steel recycling, or copper slag that occurs in copper production, are less suitable as a cement substitute because of their poor hydraulic properties. Like blast furnace slag, they are sometimes used as gravel in road construction, as inexpensive backfill material or, in the case for example of copper slag, as abrasives.

GB 2460707 describes the use of recycled material as aggregate for polymer concrete. Glass sand, plastic beads, crushed porcelain or recycled polymer concrete are used as partial substitutes for natural rocks.

WO 2010 030048 describes the use of "atomized steel slag" as a constituent of polymer concrete based on an unsaturated polyester resin. This "atomized steel slag" is produced by a special process that gives rise to additional costs, making the slag more costly. Atomized steel slag has only limited availability in terms of both amount and location.

There is an ongoing need for an inexpensive and high-quality substitute for natural aggregates in polymer concrete in the form of an industrial waste material. With any such substitute, the good properties of the polymer concrete should be retained.

SUMMARY OF THE INVENTION

It is an object of the present invention to provide, as a substitute for the natural aggregate in epoxy-resin- or polyurethane-based polymer concrete, an industrial waste material that is available worldwide in large amounts and at low cost and can be used without complex processing.

This object is surprisingly achieved by a binder composition as described in claim 1.

Binder compositions based on epoxy resin and curing agent or on polyisocyanate and polyol have the advantage over other organic binder compositions that are also used for polymer concrete, in particular over unsaturated polyester resins or acrylic resins, that they can also be easy to process and cure at low temperatures such as 5° C. or 10° C., and have good casting and leveling properties. In the case of epoxy-resin-based binder compositions, it is also possible to variably set the processing time, for example up to one hour. Also, unlike the often highly viscous unsaturated polyester resins, curing does not necessitate the use of initiators that are an explosion hazard, such as peroxides. In addition, the surface of the cured epoxy-resin- or polyurethane-based binder composition is firm and nontacky, in contrast to unsaturated polyester resins, in which the surface often hardens poorly.

Slag is a waste material from metal extraction, metal recycling or waste incineration and occurs in very large amounts worldwide. Its use in epoxy-resin-based polymer concrete helps reduce landfill waste and reduces the need for high-quality natural aggregates, the availability of which is progressively decreasing.

It is surprisingly possible to use slag in large proportions in epoxy-resin- or polyurethane-based polymer concrete without loss of quality. Epoxy-resin- or polyurethane-based polymer concrete that contains slag exhibits good properties, such as in particular high strength and good processability, even when the polymer concrete is completely free of customary fillers such as quartz sand or quartz powder in particular. The material properties, in particular the compressive strength, are surprisingly even improved compared to the prior art.

A particular surprise is that the polymer concrete of the invention has improved electrical conductivity, particularly when it contains steel slag or copper slag. In addition, it is also possible to improve the thermal conductivity.

Further aspects of the invention are the subject of further independent claims. Particularly preferred embodiments of the invention are the subject of the dependent claims.

Ways of Executing the Invention

The invention provides a curable binder composition comprising: a) at least one organic binder selected from the group consisting of a1) epoxy resins and curing agents for epoxy resins and a2) polyisocyanates and polyols, and b) at least 50% by weight of slag based on 100% by weight of the binder composition.

In the present document, "bulk density" is understood as meaning the density of a solid body. The bulk density is the ratio of the weight of the solid body to its volume, including the enclosed pore volume.

Curable organic binder compositions based on epoxy resin comprise crosslinkable epoxy resins having more than one epoxy group per molecule, which react with suitable curing agents to afford a solid material via the formation of covalent bonds.

Curable organic binder compositions that give rise to a polyurethane after curing comprise crosslinkable polyisocyanates having more than one isocyanate group per molecule, which react with polyols to afford a solid material via the formation of covalent bonds.

The binder composition of the invention is curable since the epoxy groups or isocyanate groups are still unreacted or have reacted only in part.

The binder composition advantageously contains 50% to 80% by weight, in particular 60% to 75% by weight, especially 65% to 70% by weight, of slag, based on 100% by weight of the binder composition.

However, it can also be advantageous, especially for high strengths and/or good electrical conductivity, when the binder composition contains 83% to 90% by weight, preferably 85% to 88% by weight, of slag, based on 100% by weight of the binder composition.

The binder composition preferably contains at least 60% by weight, more preferably at least 65% by weight, of slag, based on 100% by weight of the binder composition.

Slag arises as a by-product of the extraction of metals in ore smelting, metal recycling or waste incineration. It is a mixture of substances that is mainly composed of oxides and silicates of various metals. The chemical composition of slags is typically stated as the oxides, irrespective of the compounds in which the elements are actually present. For example, the content of Si is stated as $SiO_2$, the content of Al as $Al_2O_3$, and the content of Fe as FeO. Thus, an analytically determined amount of 10 g of iron (Fe) corresponds for example to an amount of 12.9 g of FeO. The stated percentage for constituents in a composition of slags refers here to the percentage of the constituent as its oxide, based on the sum of all constituents in the composition, the weight of which is likewise calculated in the form of its oxides. The main constituents of slags are CaO, $SiO_2$, $Al_2O_3$, MgO, and FeO. The proportion of these substances in different types of slag can vary greatly. The composition of the slag can be determined by X-ray fluorescence analysis in accordance with DIN EN ISO 12677.

Slag, in particular slag from metal extraction or metal recycling, is typically removed from the molten metal in the liquid state and stored to allow it to cool down, typically in slag beds. Cooling can be accelerated, for instance by spraying with water. The cooling process can influence the physical properties, in particular the crystallinity and the grain size of the slag.

Blast furnace slag (BFS) is slag that occurs during production of pig iron in a blast furnace. During the reduction process in the blast furnace, the slag forms from the other materials present alongside the iron ore and the added slag formers such as limestone or dolomite. The slag is separated from the pig iron and either allowed to cool slowly in slag beds, resulting in the formation of mainly crystalline blast furnace lump slag, or it is quickly cooled with water and/or air, resulting in the formation of glassy foundry sand (FS). Blast furnace slags typically have an iron content, calculated as FeO, of less than 3% by weight based on the overall composition of the slag and a bulk density of 2.1 to 2.8 kg/l.

Steel slag occurs as a by-product in steel production from pig iron or in steel recycling. Steelmaking employs a number of processes and steps that give rise to steel slag. Examples of steel slag are BOS, basic oxygen slag, which occurs as a by-product in steel production by the oxygen-blowing process, LD slag, which occurs in the Linz-Donawitz process, or EFS, electric furnace slag, also EAFS for electric arc furnace slag, which occurs during steel production or steel recycling using an electric arc furnace. Further examples of steel slag are slags that occur in other steel purification processes, such as slag from a ladle furnace (ladle slag). Steel slags typically have an iron content of about 5% to 45% by weight, calculated as FeO, based on the overall composition of the slag, and a bulk density of 3.0-3.7 kg/l.

Other processes that give rise to slags are for example metallurgical processes for the extraction of non-ferrous metals. These slags are known as metallurgical slags and often have a high iron content. One such metallurgical slag is copper slag, which occurs as a by-product of copper production. Copper slag typically has a high iron content, often of 40% by weight or more, calculated as FeO. Much of the iron in copper slags is typically in the form of iron silicate. Copper slags typically have a bulk density in the region of 3.7 kg/l.

Slags occurring in waste incineration plants or incineration plants for sewage sludge vary greatly in composition. An often characteristic feature thereof is a high iron content.

The slag is preferably selected from the group consisting of blast furnace slags, in particular blast furnace lump slags and foundry sands, steel slags, metallurgical slags, in particular copper slags, and slags from waste incineration, preference being given to blast furnace slags, steel slags, and metallurgical slags.

Blast furnace slags and steel slags are readily available worldwide and typically exhibit only slight variations in their chemical and mineralogical composition and physical properties from one batch to the next. Metallurgical slags, in particular copper slag, are characterized by high density and high strength.

In a preferred embodiment of the invention, the slag is an iron-containing slag containing at least 8% by weight, in particular at least 10% by weight, preferably at least 15% by weight, 20% by weight, or 25% by weight, of iron, calculated as FeO. In particular, the iron-containing slag contains 10% to 70% by weight of iron, calculated as FeO.

It has surprisingly been found that the presence in the cured binder composition of slags having a high content of iron can increase the electrical conductivity and in some cases the thermal conductivity too. They are therefore especially well-suited for the production of materials having improved electrical conductivity and in some cases improved thermal conductivity too. More particularly, slags in binder compositions intended to have improved electrical conductivity after curing contain 10% to 70% by weight, preferably 15% to 60% by weight, of iron, calculated as FeO. The iron-containing slag is preferably a steel slag, in particular slag from the electric arc furnace, casting ladle, Linz-Donawitz process or oxygen blowing process, or copper slag.

In a further preferred embodiment, the slag has a bulk density of at least 2.9 kg/l, preferably at least 3.1 kg/l, in particular at least 3.3 kg/l, especially at least 3.5 kg/l.

It has been found that binder compositions containing slags that have a high bulk density can after curing have a layer of cured binder on the upper side (upper surface) in which the proportion of slag is significantly lower than in the rest of the cured binder composition. In particular, the proportion of slag having a particle size above 0.1 mm is in this layer less than 10% by weight, in particular less than 5% by weight. This results in particularly good adhesion to an overlying material, which is especially advantageous, for example, for anchoring machines and turbines by grouting.

The preferred particle size of the slag is guided by the individual application and can be up to 32 mm or more. The slag advantageously has a particle size of not more than 16 mm, preferably not more than 8 mm, more preferably not more than 4 mm, especially not more than 3.5 mm.

Slag particles of suitable size can also be obtained by crushing and/or grinding larger slag particles.

The particle size can be determined by a sieving method in accordance with DIN EN 933-1.

The slag can be separated into grain size fractions, for example by sieving, after which the individual grain size fractions can be mixed in different amounts so as to obtain a desired grain-size distribution, the grading curve. Such methods are known to the person skilled in the art.

The slag advantageously has a particle size of 0.05 to 16 mm, preferably 0.06 to 8 mm, more preferably 0.1 to 4 mm, especially 0.12 to 3.5 mm.

The slag particles preferably are irregularly shaped and/or have a rough surface and in particular are nonspherical. This is advantageous in particular for interlinking the particles with one another and for a good bond with the binder.

In particular, the slag particles may—uniformly or non-uniformly—have any nonspherical geometric shape. For example, the particles may be conical, polygonal, cubic, pentagonal, hexagonal, octagonal, prismatic and/or polyhedral in shape. Non-uniform particles may for example have circular, elliptical, oval, square, rectangular, triangular or polygonal cross sections located at least partially therein. The terms "non-uniformly" or "irregularly" shaped particles refer to three-dimensional particle shapes in which at least two different cross sections through the particles have a different shape. Examples of cross-sections through irregularly shaped slag particles are shown schematically in FIG. 1. An overview of suitable particle shapes is provided by S. Blott, K. Pye "Particle shape: a review and new methods of characterization and classification" in *Sedimentology* (2008) 55, 31-63.

Preference is given to a slag, in particular a steel slag, that has been cooled with water, particularly in slag beds. Also advantageous is a slag, in particular a copper slag, that has been granulated as a slag stream with a pressurized-water jet.

The more rapid cooling breaks the slag into small pieces. This is advantageous because it can save energy in comminution and also because it gives rise to irregular, often angular shapes.

The moisture content of the slag is preferably less than 5% by weight, more preferably less than 3% by weight, especially preferably less than 1% by weight, in particular less than 0.5% by weight.

For certain applications it can be advantageous when the porosity of the slag is in the region of 5% by volume. This allows the weight of the product to be reduced without major adverse effect on the end properties.

For certain applications it can also be advantageous when the porosity of the slag is above 5% by volume, thereby allowing the weight of the product to be reduced. For certain applications, especially for highly pressure-resistant materials, it can also be advantageous when the porosity of the slag is less than 5% by volume, preferably less than 3% by volume.

It is also possible to modify the surface of the slag. For example, it is possible for the surface of the slag particles to be coated or covered with a wetting agent and/or a coupling auxiliary. In the context of the present invention, it is however preferable that the surface of the slag is not modified, i.e. that the slag is not present in a surface-modified form.

In addition to the slag, the binder composition advantageously also comprises at least one further mineral filler. Fillers are chemically inert, solid, particulate substances and are available in different shapes and sizes, and in the form of different materials. The shapes of mineral fillers can vary from fine sand particles to large, coarse stones. Particularly suitable fillers are sand, gravel, crushed stones, calcined pebbles or light fillers, such as in particular clay minerals, pumice stone or perlite. Further suitable fillers are fine fillers such as limestone powder, chalk, quartz powder, titanium dioxide, baryte powder or powdered alumina. It is advantageous to mix different fillers, according to type and/or particle size.

The particle size of the at least one further filler is guided by the individual application and can be up to 32 mm or more. The particle size is preferably not more than 16 mm, more preferably not more than 8 mm. The particle size is particularly preferably less than 4 mm. A particle size within a range from approximately 0.1 μm to 3.5 mm is advantageous.

The particle size can be determined by a sieving method in accordance with DIN EN 933-1.

It is advantageous to mix fillers of different particle size in accordance with the desired grading curve. Suitable grading curves for different applications are known to the person skilled in the art.

The at least one further mineral filler is advantageously selected from the group consisting of limestone powder, chalk, quartz powder, silica dust (amorphous $SiO_2$), titanium dioxide, baryte powder, and alumina, preferably having a particle size of not more than 0.1 mm.

In an advantageous embodiment of the invention, the binder composition is preferably largely free of quartz sand and quartz powder. In particular, it contains less than 10% by weight, preferably less than 5% by weight, more preferably less than 1% by weight, of quartz sand and/or quartz powder. Such a composition conserves natural resources and enables good to very good processing properties, curing properties, and use properties.

The binder composition preferably contains slag having a particle size greater than 0.1 mm and fine mineral filler that is not a slag and has a particle size of not more than 0.1 mm and no further fillers. Such compositions are easy to process and provide good strength after curing.

It is preferable when the mass ratio of slag to the at least one further mineral filler, in particular one having a particle size of not more than 0.1 mm, is from 100:0 to 60:40, in particular from 80:20 to 70:30. Such a ratio achieves good packing of the mineral fillers and good strength in the cured binder composition. It is advantageous when the slag in this case has a particle size greater than 0.1 mm.

However, it can also be advantageous when the binder composition does not contain any further filler. The slag comprises in this case all mineral particles having a size of approximately 0.1 μm up to 1 mm, 2 mm, 4 mm, 8 mm, or more. This is particularly advantageous for maximum utilization of the slag and for good strength in the cured binder composition and also, particularly in the case of iron-containing slags, for improved electrical conductivity and in some cases improved thermal conductivity too.

In a preferred embodiment of the present invention, the organic binder in the curable binder composition comprises at least one epoxy resin and at least one curing agent for the epoxy resin. Epoxy resins are low-molecular-weight or polymeric compounds that have epoxy groups. Suitable epoxy resins for the production of plastics are known in the prior art and are commercially available. Where the epoxy resins possess a defined exact number of epoxy groups per molecule, they preferably have at least two epoxy groups per molecule, for example two, three, four or more epoxy groups per molecule. Where the epoxy resin is a polymer having a varying number of epoxy groups in the molecule, it has on average more than one epoxy group per molecule. The epoxy resin then preferably contains an average of at least two epoxy groups per molecule. According to the invention, mixtures of different epoxy resins, for example of two, three or more different epoxy resins, may be used.

A suitable epoxy resin is obtained in a known manner, in particular from the oxidation of olefins or from the reaction of epichlorohydrin with polyols, polyphenols or amines.

Suitable epoxy resins are in particular aromatic epoxy resins, in particular the glycidyl ethers of:
- bisphenol A, bisphenol F or bisphenol NF, where A stands for acetone and F for formaldehyde used as reactants in the preparation of these bisphenols. In the case of bisphenol F, positional isomers may also be present, in particular ones derived from 2,4'- or 2,2'-hydroxyphenylmethane. These epoxy resins have the formula (I)

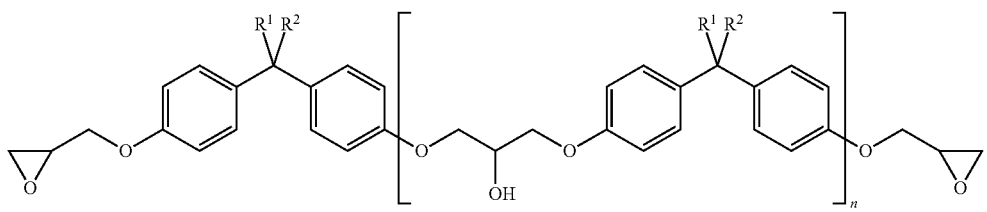

The substituents $R^1$ and $R^2$ are here independently either H or $CH_3$. In addition, the index n has a value of 0 to 1. Preferably, n has a value of less than 0.2.

Such epoxy resins are available for example as Araldite® GY 250, Araldite® PY 304, Araldite® GY 282 (Huntsman) or D.E.R.™ 331 or D.E.R.™ 330 (Dow) or Epikote 828 or Epikote 862 (Hexion).
- dihydroxybenzene derivatives such as resorcinol, hydroquinone or catechol;
- further bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z), 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxydiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl) ether or bis(4-hydroxyphenyl) sulfone;
- novolaks, which are in particular condensation products of phenol or cresols with formaldehyde or paraformaldehyde or acetaldehyde or crotonaldehyde or isobutyraldehyde or 2-ethylhexanal or benzaldehyde or furfural; Such epoxy resins are commercially available under the EPN or ECN and Tactix® 556 trade names from Huntsman or under the D.E.N.™ product series from Dow Chemical.
- aromatic amines such as aniline, toluidine, 4-aminophenol, 4,4'-methylenediphenyldiamine, 4,4'-methylenediphenyldi(N-methyl)amine, 4,4'-[1,4-phenylenebis(1-methylethylidene)]bisaniline (bisaniline P) or 4,4'-[1,3-phenylenebis(1-methylethylidene)]bisaniline (bisaniline M).

Further suitable epoxy resins are aliphatic or cycloaliphatic polyepoxides, in particular
- glycidyl ethers of saturated or unsaturated, branched or unbranched, cyclic or open-chain di-, tri- or tetrafunctional $C_2$ to $C_{30}$ alcohols, in particular ethylene glycol, propylene glycol, butylene glycol, hexanediol, octanediol, polypropylene glycols, dimethylolcyclohexane, neopentyl glycol, dibromoneopentyl glycol, castor oil, trimethylolpropane, trimethylolethane, pentaerythritol, sorbitol or glycerol, or alkoxylated glycerol or alkoxylated trimethylolpropane;
- a hydrogenated bisphenol A, F or A/F liquid resin or the glycidylation products of hydrogenated bisphenol A, F or NF;
- an N-glycidyl derivative of amides or heterocyclic nitrogen bases, such as triglycidyl cyanurate or triglycidyl isocyanurate, or reaction products of epichlorohydrin with hydantoin;
- epoxy resins from the oxidation of olefins such as in particular vinylcyclohexene, dicyclopentadiene, cyclohexadiene, cyclododecadiene, cyclododecatriene, isoprene, 1,5-hexadiene, butadiene, polybutadiene or divinylbenzene.

The epoxy resin is preferably a liquid resin or a mixture comprising two or more liquid epoxy resins.

"Liquid epoxy resin" refers to an industrial polyepoxide having a glass transition temperature below 25° C.

Optionally, the epoxy resin composition additionally comprises proportions of solid epoxy resin.

The epoxy resin is in particular a liquid resin based on a bisphenol, in particular a bisphenol A diglycidyl ether and/or bisphenol F diglycidyl ether, as are commercially available for example from Olin, Huntsman or Momentive. These liquid resins have a viscosity that is low for epoxy resins and make it possible to achieve rapid curing and to obtain high-modulus and highly-pressure-resistant materials. They may comprise proportions of solid bisphenol A resin or novolak glycidyl ethers.

The binder composition based on epoxy resin preferably additionally comprises at least one reactive diluent.

Suitable reactive diluents are low-viscosity aliphatic or cycloaliphatic compounds containing epoxy groups.

The reactive diluents are preferably monofunctional glycidyl ethers such as phenyl glycidyl ether, cresyl glycidyl ether, guaiacol glycidyl ether, 4-methoxyphenyl glycidyl ether, p-n-butylphenyl glycidyl ether, p-tert-butylphenyl glycidyl ether, 4-nonylphenyl glycidyl ether, 4-dodecylphenyl glycidyl ether, cardanol glycidyl ether, benzyl glycidyl ether, allyl glycidyl ether, butyl glycidyl ether, hexyl glycidyl ether, 2-ethylhexyl glycidyl ether, or glycidyl ethers of natural alcohols such as in particular $C_8$ to $C_{10}$ or $C_{12}$ to $C_{14}$ or $C_{13}$ to $C_{15}$ alkyl glycidyl ethers, difunctional glycidyl ethers, such as butanediol diglycidyl ether, hexanediol diglycidyl ether, trimethylolpropane diglycidyl ether or neopentyl glycol diglycidyl ether, trifunctional glycidyl ethers, such as trimethylolpropane triglycidyl ether, or aliphatic polyols having one, two, three or more functional glycidyl ether groups. Also suitable are epoxidized soybean oil or linseed oil, compounds having acetoacetate groups, in particular acetoacetylated polyols, butyrolactone, and also isocyanates and silicones having reactive groups.

Curing agents used for the epoxy resin may be customary and known compounds that react with the epoxy groups. These result in crosslinking of the epoxy resin. The curing agents are preferably basic curing agents, in particular amine compounds or amides.

The curing agent is preferably a polyamine having at least three amine hydrogens reactive toward epoxy groups.

Amine hydrogens are hydrogen atoms that are attached directly to an amine nitrogen atom and are able to react with epoxy groups.

The curing agent for the epoxy resin preferably contains at least two primary or secondary amino groups per molecule. Amine compounds having two or more amino groups per molecule are referred to hereinafter as "polyamines".

Preferably, polyamines are present in the epoxy resin composition in an amount such that the molar ratio of amine hydrogens to epoxy groups is within a range from 0.6 to 1.5, in particular 0.8 to 1.2.

It is possible according to the invention to use mixtures of different curing agents for the epoxy resin, for example mixtures of two, three or more different curing agents.

Polyamines suitable as curing agents for the epoxy resin are in particular aliphatic, cycloaliphatic or arylaliphatic primary diamines, in particular ethylenediamine, propane-1,2-diamine, propane-1,3-diamine, 2-methylpropane-1,2-diamine, 2,2-dimethylpropane-1,3-diamine, butane-1,3-diamine, butane-1,4-diamine, pentane-1,3-diamine (DAMP), pentane-1,5-diamine, 1,5-diamino-2-methylpentane (MPMD), 2-butyl-2-ethylpentane-1,5-diamine (C11 neodiamine), hexane-1,6-diamine, 2,5-dimethylhexane-1,6-diamine, 2,2,4- and 2,4,4-trimethylhexamethylenediamine (TMD), heptane-1,7-diamine, octane-1,8-diamine, nonane-1,9-diamine, decane-1,10-diamine, undecane-1,11-diamine, dodecane-1,12-diamine, 1,2-, 1,3-or 1,4-diaminocyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane (M-MECA), 1-amino-3-aminomethyl-3,5,5-trimethylcyclohexane (=isophoronediamine or IPDA), 2(4)-methyl-1,3-diaminocyclohexane, 1,3- or 1,4-bis(aminomethyl)cyclohexane, 1,3-cyclohexylenebis(methylamine), 2,5(2,6)-bis(aminomethyl)bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), menthane-1,8-diamine, 3,9-bis(3-aminopropyl)-2,4,8,10-tetraoxaspiro[5.5]undecane, 1,3-bis(aminomethyl) benzene (MXDA) or 1,4-bis(aminomethyl)benzene;

aliphatic primary diamines containing ether groups, in particular bis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine, and higher oligomers of these diamines, bis(3-am inopropyl)polytetrahydrofuran and other polytetrahydrofurandiamines having molecular weights within a range of for example 350 to 2000, and also polyoxyalkylene diamines. The latter are typically products from the amination of polyoxyalkylene diols and are available for example under the Jeffamine® name (from Huntsman), under the Polyetheramine name (from BASF) or under the PC Amine® name (from Nitroil). Particularly suitable polyoxyalkylene diamines are Jeffamine® D-230, Jeffamine® D-400, Jeffamine® D-2000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176, Polyetheramine D 230, Polyetheramine D 400 and Polyetheramine D 2000, PC Amine® DA 250, PC Amine® DA 400, PC Amine® DA 650, and PC Amine® DA 2000;

polyamines containing secondary amino groups, in particular diethylenetriamine (DETA), triethylenetetramine (TETA), tetraethylenepentamine (TEPA), pentaethylenehexamine (PEHA), higher homologs of linear polyethylene amines, dipropylenetriamine (DPTA), N-(2-aminoethyl)propane-1,3-diamine (N3 amine), N,N'-bis(3-am inopropyl)ethylenediamine (N4 amine), N,N'-bis(3-aminopropyl)-1,4-diaminobutane, N5-(3-aminopropyl)-2-methylpentane-1,5-diamine, N3-(3-aminopentyl)pentane-1,3-diamine, N5-(3-amino-1-ethylpropyl)-2-methylpentane-1,5-diamine, N,N'-bis(3-amino-1-ethylpropyl)-2-methylpentane-1,5-diamine or bis(6-aminohexyl)amine (BHMT), 3-(dimethylamino)propylamine (DMAPA), 3-(3-(dimethylamino)propylamino)propylamine (DMAPAPA), N-alkylated polyetheramines, for example the Jeffamine® products SD-231, SD-401, SD-404, and SD-2001 (from Huntsman), N-benzylethane-1,2-diamine, N-benzylpropane-1,2-diamine, N-benzyl-1,3-bis(aminomethyl)benzene, N-(2-ethylhexyl)-1,3-bis(aminomethyl)benzene, N-(2-phenylethyl)-1,3-bis(aminomethyl)benzene (constituent of styrenized 1,3-bis (aminomethyl)benzene, available as Gaskamine® 240 from Mitsubishi Gas Chemical), N-benzyldiethylenetriamine, N-benzyltriethylenetetramine, N-benzyltetraethylenepentamine, N'-benzyl-N-(3-am inopropyl)ethylenediamine or N''-benzyl-N,N'-bis(3-am inopropyl)ethylenediamine;

amine/polyepoxide adducts; in particular adducts of the polyamines mentioned with diepoxides in a molar ratio of at least 2/1, especially in a molar ratio of 2/1 to 10/1, or with monoepoxides;

polyamidoamines that are reaction products of a mono- or polybasic carboxylic acid, or the esters or anhydrides thereof, in particular reaction products of a dimer fatty acid, and an aliphatic, cycloaliphatic or aromatic polyamine used in a stoichiometric excess, in particular a polyalkyleneamine, for example DETA or triethylenetetramine (TETA), in particular the commercially available polyamidoamines Versamid® 100, 125, 140, and 150 (from Cognis), Aradur® 125, 140, 223, 250, and 848 (from Huntsman), Euretek® 3607, Euretek® 530 (from Huntsman), Beckopox® EH 651, EH 654, EH 655, EH 661, and EH 663 (from Cytec);

polyethyleneimines (PEI), these being branched polymeric amines from the polymerization of ethyleneimine. A suitable polyethyleneimine typically has an average molecular weight within a range from 250 to 25 000 g/mol and contains tertiary, secondary, and primary amino groups.

Polyethyleneimines are available for example under the trade name Lupasol® (from BASF), for example Lupasol® WF, Lupasol® FG, Lupasol® G20, and Lupasol® PR 8515.

Mannich bases, in particular phenalkamines, i.e. reaction products of phenols, in particular cardanol, with aldehydes, in particular formaldehyde, and polyamines.

Curing agents used for the epoxy resin may also be compounds containing mercapto groups, in particular liquid mercaptan-terminated polysulfide polymers, mercaptan-terminated polyoxyalkylene ethers, mercaptan-terminated polyoxyalkylene derivatives, polyesters of thiocarboxylic acids, 2,4,6-trimercapto-1,3,5-triazine, triethylene glycol dimercaptan or ethanedithiol.

Curing agents used for the epoxy resin may also be acid curing agents, in particular acid anhydrides. It is also possible to use catalytically active curing agents such as fluorides, for example boron trifluoride.

The curing agent for the epoxy resin is preferably selected from the group consisting of TMD, 1,2-, 1,3- or 1,4-diaminocyclohexane, 1,3-bis(aminomethyl)cyclohexane, 1,4-bis(aminomethyl)cyclohexane, bis(4-aminocyclohexyl)methane, IPDA, 2(4)-methyl-1,3-diaminocyclohexane, MXDA, DETA, TETA, TEPA, PEHA, N4 amine, DMAPAPA, N-benzylethane-1,2-diamine, adducts of these or further polyamines with mono- or diepoxides and Mannich bases.

In a further preferred embodiment of the present invention, the organic binder in the curable binder composition comprises at least one polyisocyanate and at least one polyol.

Polyisocyanate is understood as meaning a compound that contains two or more isocyanate groups. The term polyisocyanate here also encompasses polymers containing isocyanate groups. Polyisocyanates give rise to polyurethanes through a reaction with atmospheric moisture or with polyols. The term "polyurethane" here refers to polymers formed by what is known as diisocyanate polyaddition. In addition to the urethane groups, these polymers can also have other groups, in particular urea groups.

Preferred polyisocyanates are aliphatic, cycloaliphatic or aromatic diisocyanates, in particular hexamethylene 1,6-diisocyanate (HDI), 1-isocyanato-3,3,5-trimethyl-5-isocyanatomethylcyclohexane (isophorone diisocyanate or IPDI), perhydrodiphenylmethane 2,4'- and/or 4,4'-diisocyanate ($H_{12}$MDI), diphenylmethane 4,4'-diisocyanate, with or without fractions of diphenylmethane 2,4'- and/or 2,2'-diisocyanate (MDI), tolylene 2,4-diisocyanate or mixtures thereof with tolylene 2,6-diisocyanate (TDI), mixtures of MDI and MDI homologs (polymeric MDI or PMDI) or oligomeric isocyanates. A suitable polymer containing isocyanate groups is in particular obtained from the reaction of at least one polyol with a superstoichiometric amount of at least one polyisocyanate, in particular diisocyanate, preferably MDI, TDI, IPDI or HDI.

Suitable polyols are in particular the following commercially available polyols or mixtures thereof:

polyether polyols, in particular polyoxyalkylene diols and/or polyoxyalkylene triols. Preferred polyether polyols are polyoxypropylenediols, polyoxypropylentriols or ethylene oxide-terminated (EO-endcapped) polyoxypropylenediols or -triols.

polyester polyols, also called oligoesterols, prepared by known processes, in particular the polycondensation of hydroxycarboxylic acids or lactones or the polycondensation of aliphatic and/or aromatic polycarboxylic acids with di- or polyhydric alcohols. Particularly suitable polyester polyols are polyester diols.

polycarbonate polyols as obtainable by reaction for example of the abovementioned alcohols—used to form the polyester polyols—with dialkyl carbonates, diaryl carbonates or phosgene.

block copolymers bearing at least two hydroxyl groups and having at least two different blocks having polyether, polyester and/or polycarbonate structure of the type described above, in particular polyether polyester polyols.

polyacrylate polyols and polymethacrylate polyols, polyhydroxy-functional fats and oils, also called fatty acid polyols, polyhydrocarbon polyols, also called oligohydrocarbonols, epoxidized vegetable oils and reaction products thereof with monofunctional alcohols, polybutadiene polyols, reaction products of vegetable oils, in particular castor oil, with ketone resins, polyester polyols based on hydrogenated tall oil, polyester polyols based on dimer fatty acids or dimer fatty alcohols, alkoxylated polyamines.

When the binder composition comprises as binder a polyisocyanate and a polyol, it preferably comprises at least one aromatic polyisocyanate and at least one polyol selected from the group consisting of epoxidized vegetable oils and reaction products thereof with monofunctional alcohols, polybutadiene polyols, reaction products of vegetable oils, in particular castor oil, with ketone resins, polyester polyols based on hydrogenated tall oil, and polyester polyols based on dimer fatty acids or dimer fatty alcohols.

Especially advantageous are combinations of polyisocyanates and polyols as described in EP 3 339 343 and EP 3 415 544.

Such binder compositions are particularly hydrophobic, do not absorb moisture after curing, and are stable to hydrolysis, which is advantageous.

The binder composition may optionally comprise one or more additives, in particular non-reactive diluents, dispersants, defoamers, wetting agents, preservatives, accelerators, thickeners, pigments, polymer powders, fibers, plasticizers or dyes.

Suitable non-reactive diluents, particularly in binder compositions that contain an epoxy resin, are organic solvents or higher-boiling thinners, in particular xylene, 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol monomethyl ether, diethylene glycol monoethyl ether, diethylene glycol mono-n-butyl ether, diethylene glycol dimethyl ether, diethylene glycol diethyl ether, diethylene glycol di-n-butyl ether, propylene glycol butyl ether, propylene glycol phenyl ether, dipropylene glycol, dipropylene glycol monomethyl ether, dipropylene glycol dimethyl ether, dipropylene glycol di-n-butyl ether, diphenylmethane, diisopropylnaphthalene, mineral oil fractions, for example Solvesso® products (from Exxon), alkylphenols such as tert-butylphenol, nonylphenol, dodecylphenol, cardanol (from cashew nut shell oil, containing 3-(8,11,14-pentadecatrienyl)phenol as its main constituent), styrenized phenol, bisphenols, aromatic hydrocarbon resins, in particular types containing phenol groups, alkoxylated phenol, in particular ethoxylated or propoxylated phenol, in particular 2-phenoxyethanol, adipates, sebacates, phthalates, benzoates, organic phosphoric or sulfonic esters or sulfonamides.

Preferred thinners have a boiling point above 200° C.

The thinner is preferably selected from the group consisting of benzyl alcohol, styrenized phenol, ethoxylated phenol, aromatic hydrocarbon resins containing phenol groups, in particular the Novares® LS 500, LX 200, LA 300 or LA 700 products (from Rütgers), diisopropylnaphthalene and cardanol.

Particular preference is given to benzyl alcohol.

Thinners containing phenol groups are also effective as accelerator.

Suitable accelerators, particularly in binder compositions comprising an epoxy resin, are compounds that accelerate the reaction of epoxy groups and/or amino groups, in particular acids or compounds hydrolyzable to acids, in particular organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic esters, other organic or inorganic acids such as in particular phosphoric acid, or mixtures of the abovementioned acids and acid esters; nitrates such as calcium nitrate in particular; tertiary amines, such as in particular 1,4-diazabicyclo[2.2.2]octane, benzyldimethylamine, α-methylbenzyldimethylamine, triethanolamine, dimethylaminopropylamine, imidazoles such as in particular N-methylimidazole, N-vinylimidazole or 1,2-dimethylimidazole, salts of such tertiary amines, quaternary ammonium salts, such as in particular benzyltrimethylammonium chloride, amidines such as in particular 1,8-diazabicyclo[5.4.0]undec-7-ene, guanidines such as in particular 1,1,3,3-tetramethylguanidine, phenols, in particular bisphenols, phenolic resins or Mannich bases, such as in particular 2-(dimethylaminomethyl)phenol, 2,4,6-tris(dimethylaminomethyl)phenol or polymers from phenol, formaldehyde, and N,N-dimethylpropane-1,3-diamine, phosphites such as in particular di- or triphenyl phosphites, or compounds having mercapto groups.

Preferred accelerators are acids, nitrates, tertiary amines or Mannich bases.

Particular preference is given to salicylic acid, p-toluenesulfonic acid, calcium nitrate or 2,4,6-tris(dimethylaminomethyl)phenol or a combination thereof.

Suitable catalysts, particularly in binder compositions comprising polyisocyanates and polyols, are metalorganic compounds or amines, in particular secondary and tertiary amines.

Preferably present in the binder composition is at least one wetting agent and/or dispersant, in particular one based on a polycarboxylate ether. This affords better processability, in particular good flowability, and a high proportion of fillers, which is advantageous for good homogeneity and strength in the cured binder composition.

In this document, polycarboxylate ether is understood as meaning a comb polymer in which anionic groups as well as polyalkylene glycol side chains are covalently attached to the polymer backbone. Such polymers are known as plasticizers for mineral binders such as cement and gypsum.

Preferred polycarboxylate ethers include structural units of the formula I and structural units of the formula II,

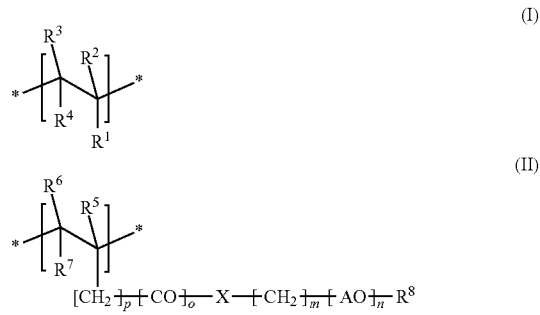

where $R^1$, in each case independently, is —COOM, —SO$_2$—OM, —O—PO(OM)$_2$ and/or —PO(OM)$_2$, preferably —COOM, $R^2$ and $R^5$, in each case independently, are H, —CH$_2$—COOM or an alkyl group having 1 to 5 carbon atoms, preferably H or —CH$_3$, $R^3$ and $R^6$, in each case independently, are H or an alkyl group having 1 to 5 carbon atoms, preferably H, $R^4$ and $R^7$, in each case independently, are H, —COOM or an alkyl group having 1 to 5 carbon atoms, preferably H, or where $R^1$ and $R^4$ form a ring to give —CO—O—CO— (anhydride), M, in each case independently, is H$^+$, an alkali metal ion, an alkaline earth metal ion, a di- or trivalent metal ion, an ammonium group or an organic ammonium, preferably H$^+$ or an alkali metal ion, p=0, 1 or 2, o=0 or 1, m=0, or an integer from 1 to 4, n=2-250, in particular 10-200, X, in each case independently, is —O— or —NH—, $R^8$, in each case independently, is H, a C$_1$ to C$_{20}$ alkyl group, cyclohexyl group or alkylaryl group, and A=C$_2$ to C$_4$ alkylene, preferably ethylene.

The molar ratio of structural unit I to structural unit II is preferably 0.7-10:1, more preferably 1-8:1, in particular 1.5-5:1.

It can also be advantageous when the polycarboxylate ether further comprises a structural unit III. Structural unit III is preferably derived from monomers selected from the group consisting of alkyl or hydroxyalkyl esters of acrylic or methacrylic acid, vinyl acetate, styrene and N-vinylpyrrolidone.

The polycarboxylate ether preferably contains carboxylic acid groups and/or salts thereof and polyethylene glycol side chains.

Preferably, the polycarboxylate ether is composed of structural units I derived from ethylenically unsaturated carboxylic acids, in particular unsaturated monocarboxylic acids, or salts thereof, and structural units II derived from ethylenically unsaturated polyalkylene glycols, in particular polyethylene glycols. In particular, the polycarboxylate ether does not contain any other structural units aside from structural units I and structural units II.

The binder composition is preferably free of organosilanes. In particular, the binder composition does not contain any organosilanes selected from the group consisting of glycidoxypropyltrimethoxysilane, glycidoxypropyltriethoxysilane, glycidoxypropylmethyldiethoxysilane, glycidoxypropylmethyldimethoxysilane, 2-(3,4-epoxycyclohexyl)ethyltrimethoxysilane, aminopropyltrimethoxysilane, aminopropyltriethoxysilane, aminoethylaminopropyltrimethoxysilane, aminoethylaminopropyltriethoxysilane, aminoethylaminopropylmethyldimethoxysilane, aminoethylaminopropylmethyldiethoxysilane, phenylaminopropyltrimethoxysilane, aminopropylaminopropylmethyldimethoxysilane, aminopropylaminopropylmethyldiethoxysilane.

The slag and optionally also the at least one further filler, if present, are preferably coated with the wetting agent and/or dispersant. Coating can be accomplished by simply spraying with a liquid wetting agent and/or dispersant or with a solution of a liquid or solid wetting agent and/or dispersant in a suitable solvent.

An advantageous binder composition comprising at least one epoxy resin and at least one polyamine contains:
- 5% to 30% by weight, preferably 8% to 25% by weight, more preferably 8% to 17% by weight, of epoxy resins,
- 0.4% to 7% by weight, preferably 1% to 5% by weight, of polyamines,
- 10% to 25% by weight of mineral fillers that are not slag, in particular having a particle size of not more than 0.1 mm,
- 50% to 80% by weight, preferably 60% to 75% by weight, of slag, in particular having a particle size of 0.1 to 16 mm, preferably 0.1 to 8 mm, especially 0.1 to 4 mm or 0.1 to 3.5 mm, and
- 0% to 10% by weight, preferably 0.01% to 5% by weight, of further additives, based on 100% by weight of the binder composition.

An advantageous binder composition comprising at least one epoxy resin and at least one polyamine consists of:
- 5% to 30% by weight, preferably 8% to 25% by weight, more preferably 8% to 17% by weight, of epoxy resins,
- 0.4% to 7% by weight, preferably 1% to 5% by weight, of polyamines,
- 10% to 25% by weight of mineral fillers that are not slag, in particular having a particle size of not more than 0.1 mm,
- 50% to 80% by weight, preferably 60% to 75% by weight, of slag, in particular having a particle size of 0.1 to 16 mm, preferably 0.1 to 8 mm, especially 0.1 to 4 mm or 0.1 to 3.5 mm, and
- 0% to 10% by weight, preferably 0.01% to 5% by weight, of further additives, based on 100% by weight of the binder composition.

Another advantageous binder composition comprising at least one epoxy resin and at least one polyamine contains:
- 8% to 16% by weight of epoxy resins,
- 1% to 5% by weight of polyamines,
- 83% to 90% by weight, preferably 85% to 88% by weight, of slag, in particular having a particle size of not more than 16 mm, preferably not more than 8 mm, especially not more than 4 mm or not more than 3.5 mm, and
- 0% to 8% by weight, preferably 0.01% to 5% by weight, of further additives, based on 100% by weight of the binder composition.

An advantageous binder composition comprising at least one polyisocyanate and at least one polyol contains:
- 3% to 40% by weight, preferably 7% to 20% by weight, of polyisocyanates,
- 2% to 40% by weight, preferably 3% to 10% by weight, of polyols,
- 50% to 94% by weight of fillers, in particular mineral fillers, wherein at least 20% by weight of the fillers are iron-containing slag, and
- 0% to 15% by weight of further additives, based on 100% by weight of the binder composition.

An advantageous binder composition comprising at least one polyisocyanate and at least one polyol consists of:
- 7% to 20% by weight of polyisocyanates,
- 3% to 10% by weight of polyols,
- 50% to 94% by weight of fillers, in particular mineral fillers, wherein at least 20% by weight of the fillers are iron-containing slag, and
- 0% to 15% by weight of further additives, based on 100% by weight of the binder composition.

Before it is used, the binder composition is preferably present as a multicomponent system, in particular as a system having two or three components. The constituents capable of reacting with one another in a curing reaction are preferably present in containers stored separately from one another. In this form, the binder composition can be stored for a period of several months up to a year and longer without its properties altering to an extent relevant to its use. Only when the binder composition is used are the reactive components of the organic binder mixed with one another, whereupon curing of the binder composition commences.

The invention further provides a multicomponent system for producing a curable binder composition, comprising at least one resin component comprising at least one epoxy resin, and at least one curing agent component comprising at least one curing agent for epoxy resins, wherein slag and optionally further ingredients are present in the resin components, in the curing agent components and/or in any further components optionally present, especially in a solid component. The solid component is also referred to as the filler component. It typically has a powdery, free-flowing consistency, whereas the binder components at 23° C. typically have a liquid, sometimes pasty, consistency.

The weight ratio of the resin component to the curing agent component is preferably within a range from 8:1 to 2:1, more preferably 6:1 to 3:1.

The weight ratio of resin component plus curing agent component to the solid component is preferably 1:3 to 1:12, in particular 1:4 to 1:10.

The resin component may additionally comprise compatible additives, in particular reactive diluents, solvents and/or non-reactive diluents. Such additives are usually used to lower the viscosity and thus to improve the processability.

The curing agent component can in accordance with the invention mostly consist of a single curing agent or of a mixture of different ones, or it may additionally comprise further suitable and compatible additives such as accelerators or non-reactive diluents.

The invention further provides a multicomponent system for producing a curable binder composition, comprising at least one polyisocyanate component comprising at least one polyisocyanate, and at least one polyol component comprising at least one polyol, wherein slag and optionally further ingredients are present in the polyisocyanate component, in the polyol component and/or in a further component, in a solid component.

The weight ratio of the polyisocyanate component to the polyol component is preferably within a range from 2:1 to 1:3, more preferably from 1:1 to 1:2. The weight ratio of polyisocyanate component plus polyol component to the solid component is preferably 1:3 to 1:12, in particular 1:4 to 1:10.

The multicomponent system preferably comprises a solid component that comprises slag. The solid component preferably comprises at least 60% by weight, preferably at least 70% by weight, especially at least 80% by weight, or at least 90% by weight, advantageously even 100% by weight, of slag.

In addition to the slag, the solid component preferably comprises the optional at least one further filler, the optional wetting agent and/or dispersant, and optionally further additives.

A preferred composition of the solid component comprises:
70% to 90% by weight of slag, in particular having a particle size of 0.1 to 16 mm, preferably 0.11 to 8 mm, in particular 0.12 to 4 mm,
10% to 30% by weight of further fillers, in particular having a particle size of not more than 0.1 mm, in particular about 0.1 µm to 0.1 mm,
0% to 2% by weight, in particular 0.01% to 1.5% by weight, of additives comprising at least one wetting agent or dispersant, in particular a polycarboxylate ether, and
0% to 5% by weight of an organic solvent, in particular a solvent in which the polycarboxylate ether is soluble.

A further preferred composition of the solid component comprises:
93% to 100% by weight, preferably 95% to 99.97% by weight, of slag, in particular having a particle size of about 0.1 µm to 16 mm, preferably about 0.1 µm to 8 mm, in particular about 0.1 µm to 4 mm,
0% to 1.5% by weight, preferably 0.01% to 1% by weight, of a polycarboxylate ether, and
0% to 5% by weight, preferably 0.02% to 4% by weight, of an organic solvent in which the polycarboxylate ether is soluble.

The invention further provides for the use of the binder composition or of the multicomponent system for the bonding, coating or sealing of substrates, for the filling of edges, holes or joints, as anchoring or injection resin, as a grouting or casting compound, as a floor covering and/or for production of moldings.

The invention further provides for the use of the binder composition of the invention or of the multicomponent system of the invention for the production of materials having improved electrical conductivity at 20° C., characterized in that the slag in the binder composition is an iron-containing slag comprising at least 8% by weight of iron, calculated as FeO, based on the total weight of the slag, and/or a slag having a bulk density of at least 3.1 kg/l.

A cured binder composition of this kind surprisingly shows improved electrical conductivity compared to a cured binder composition that, instead of the iron-containing slag, contains the same amount by weight of quartz sand having the same grading curve.

The material with improved electrical conductivity preferably has a specific electrical volume resistance that is reduced by a factor of at least 2, more preferably at least 2.5, in particular at least 3.0, compared to a material that is otherwise identical except for containing quartz sand of the same particle size instead of the iron-containing slag. The electrical volume resistance is determined between the two opposite 40×40 mm surfaces of a prism of 40×40×160 mm by applying a voltage of 100 mV and a frequency of 1 kHz, at 20° C., the measurement being performed after storage for 7 days at 20° C.

Curable binder compositions comprising slags having a bulk density of at least 2.9 kg/l, in particular at least 3.1 kg/l, preferably at least 3.3 kg/l, especially at least 3.5 kg/l, are particularly advantageous for the grouting of machines. This makes it possible to obtain an especially good bond between the cured binder composition and the overlying machine or turbine that has been grouted, as well as good compressive strength in the grouting material.

The multicomponent system is used by mixing the components. This is advantageously done by first mixing thoroughly the at least two components comprising the constituents of the organic binder and then mixing in thoroughly the component comprising the slag, if such a separate component is present. Further components or additives may also be added. Once all the components have been mixed, curing takes place. Such processing is known to the person skilled in the art.

The freshly mixed curable binder composition can surprisingly be processed very easily and homogeneously at ambient temperatures despite the high proportion of slag.

It can also be advantageous, in particular for use of the binder composition of the invention as leveling mortar, screed or floor coating, when a binder composition of the invention is mixed and applied in the following steps:
mixing of all the components of the binder composition, except for fillers having a particle size greater than 0.06 mm, using suitable mixing devices,
applying the mixture as leveling mortar, screed or floor coating, and
sprinkling with fillers having a particle size greater than 0.06 mm, wherein at least 20% by weight of these fillers is iron-containing slag, manually or using a suitable device.

The invention further provides a cured binder composition obtained by curing the curable binder composition of the invention or by mixing the components and curing the multicomponent system of the invention.

Curing preferably takes place at ambient temperatures, in particular at a temperature within a range from 5 to 40° C., in particular 7 to 35° C.

The binder composition is cured when there is no longer any significant reaction between epoxy groups and the curing agent/isocyanate groups and the hydroxyl groups of the polyol. The cured binder composition has a solid consistency. In particular, it can be in the form of a three-dimensional object or component, or as a coating, bonding layer, spackling compound, constituent of a laminate, adhesive, filling or seal.

The slag and filler, if present, are preferably distributed in the cured binder composition uniformly or essentially uniformly.

However, it can also be advantageous, in particular for underfilling, for example of machines and turbines, when the concentration of slag in the topmost layer of the horizontal surface of the cured binder composition is lower than in the rest of the cured binder composition, in particular less than 10% by weight.

This can improve the bond between the binder composition and the object to be underfilled.

BRIEF DESCRIPTION OF THE FIGURES

FIG. 1 shows: a schematic representation of exemplary cross sections of irregularly shaped slag particles.

EXAMPLES

Working examples are presented hereinbelow, the purpose of which is to further elucidate the described invention. The invention is of course not limited to these described working examples.

"Ex." stands for "example".
"Ref." stands for "reference example".
Materials Used The quartz sand and slags were dried before use and divided into grain fractions by sieving. The grain fractions were then mixed such that the grain size distribution of the sands used corresponded to a specified grain size distribution (grading curve).

EFS is an electric furnace slag from Stahl Gerlafingen, Switzerland. The material used had a bulk density of around 3.3 kg/l and an iron content, calculated as FeO, of about 19% by weight.

BFS is a blast furnace slag from Hüttenwerke Krupp Mannesmann, Germany, available from Hermann Rauen GmbH & Co., Germany. The material used had a bulk density of 2.9 kg/l and an iron content, calculated as FeO, of about 3% by weight.

Raulit® is a blast furnace slag from DK-Recycling and Roheisen GmbH, Germany, available under the brand name Raulit®-Mineralbaustoffgemisch from Hermann Rauen GmbH & Co., Germany. The material used had a bulk density of around 2.9 kg/l and an iron content, calculated as FeO, of about 1% by weight.

FS is a foundry sand from voestalpine AG, Austria. The material used had a bulk density of around 2.9 kg/l and an iron content, calculated as FeO, of less than 1% by weight.

CS is NAstra® iron silicate granules, a glassy copper slag available from Sibelco, Germany, having a bulk density of about 3.7 kg/l and an iron content, calculated as FeO, of about 51% by weight.

Sikadur®-42 HE is a three-component epoxy-resin-based grouting mortar available from Sika Schweiz AG.

The polycarboxylate ether (PCE) was a comb polymer with carboxylic acid groups and polyethylene glycol side chains.
Measurement Methods The compressive strength and flexural strength were determined on 40×40×160 mm test specimens using testing machines in accordance with DIN EN 196-1.

For determination of the specific electrical volume resistance, the opposite 40×40 mm surfaces of the 40×40×160 mm test specimens were coated with electrically conductive gel and a steel electrode covering the entire surface was placed flush on both surfaces. The electrical volume resistance of the test specimens was determined by applying a voltage of 100 mV AC at a frequency of 1 kHz and 10 kHz to the two electrodes.

The thermal conductivity was determined in accordance with ASTM D5470-06 using the ZFW TIM tester from ZFW (Center for Thermal Management) Stuttgart, Germany, on test specimens 30 mm in diameter and 2 mm in height.
Production of the Test Specimens Sikadur®-42 HE component A (comprising the epoxy resin; resin content 99.9% by weight) was mixed thoroughly with the associated component B (comprising the curing agent; curing agent content 70% by weight) in a weight ratio of 3:1 and then a self-produced solid component as per Table 1 was added and mixed in thoroughly. The weight ratio of component A to component B to solid component was 3:1:34.

To produce the test specimens, the mixed grouting mortar was poured into steel molds and stored in the formwork for 24 hours at 20° C. The test specimens were then removed from the formwork and stored further at 20° C. After 7 days of storage, the specific electrical resistance, strength, and thermal conductivity were determined.

TABLE 1

Composition of the solid component

| Constituent | % by wt. |
| --- | --- |
| Mixture of limestone powder and baryte powder, <0.1 mm | 24.9 |
| Sand (slag sand or quartz sand)*, 0.12-3.2 mm | 74.6 |
| Polycarboxylate ether solution (20% by weight of polycarboxylate ether dissolved in 80% by weight of benzyl alcohol) | 0.5 |

*sand type: see the reference example and the examples.

For production of the solid component, the solid constituents were mixed dry and the polycarboxylate ether solution sprayed thereon while mixing.

Strength and Electrical Volume Resistance of Epoxy-Resin-Based Grouting Mortars

The type of sand used for epoxy resin compositions M-1 to M-7 and the properties thereof in the liquid state and cured state are shown in Table 2.

TABLE 2

|  | Ref. 1 | Ex. 1 | Ex. 2 | Ex. 3 | Ex. 4 | Ex. 5 | Ex. 6 |
|  | M-1 | M-2 | M-3 | M-4 | M-5 | M-6 | M-7 |
| --- | --- | --- | --- | --- | --- | --- | --- |
| Sand | Quartz sand | EFS[1] | EFS | BFS crystalline | Raulit ® | FS | CS |
| Consistency after mixing | fluid[2] | viscous[3] | fluid | fluid | fluid | fluid | fluid |

TABLE 2-continued

|  | Ref. 1 M-1 | Ex. 1 M-2 | Ex. 2 M-3 | Ex. 3 M-4 | Ex. 4 M-5 | Ex. 5 M-6 | Ex. 6 M-7 |
|---|---|---|---|---|---|---|---|
| Compressive strength [MPa] | 103.9 | 131.1 | 120.3 | 117.2 | 116.3 | 113.2 | 115.9 |
| Flexural strength [MPa] | 26.3 | 33.4 | 29.9 | 26.8 | 28.2 | 27.0 | 31.2 |
| Specific electrical volume resistance [MΩ · cm] at 1 kHz | 175 | n/a[4] | 40 | 121 | 137 | 187 | 27 |
| Factor[5] 1 kHz |  |  | 4.4 | 1.4 | 1.3 | 0.9 | 6.5 |
| Specific electrical volume resistance [MΩ · cm] at 10 kHz | 17 | n/a | 5.2 | 12 | 14 | 21 | 3.1 |
| Factor 10 kHz |  |  | 3.3 | 1.4 | 1.2 | 0.8 | 5.5 |

[1]without adding a polycarboxylate ether solution to the solid component
[2]fluid: self-flowing, could be poured into the mold
[3]viscous: mortar was not self-flowing, the mold had to be vibrated strongly in order to obtain a homogeneous test specimen
[4]n/a: no measured value available
[5]factor by which the specific electrical volume resistance of mortar M-2 to M-7 is reduced compared to the specific electrical volume resistance of the reference mortar M1, e.g. resistance M1/resistance M2

Thermal Conductivity of an Inventive Grouting Mortar M-8

Example 7

Sikadur®-42 HE component A (epoxy-resin-based resin component; resin content 99.9% by weight) was mixed thoroughly with the associated component B (curing agent component based on amine curing agent; curing agent content 70% by weight) in a weight ratio of 3:1. Into 40 g of this epoxy mixture was then mixed in thoroughly a solid component consisting of:
- 252 g of EFS sand having a particle size of 0.12-0.32 mm,
- 86 g of a mixture of limestone powder and baryte powder having a particle size of less than 0.1 mm, and
- 1.4 g of commercial wetting agent.

A test specimen having a diameter of 30 mm and a height of 2 mm was produced by pouring into appropriate molds and allowed to cure at 20° C. for 7 days.

The thermal conductivity of the sample was 2.06 W/(m·K). This is significantly higher than the thermal conductivity of a commercial epoxy resin having typically 0.20 W/(m·K).

Epoxy-Resin-Based Grouting Mortar Having Varying Amounts of Copper Slag

Sikadur®-42 HE component A (comprising the epoxy resin; resin content 99.9% by weight) was mixed thoroughly with the associated component B (comprising the curing agent; curing agent content 70% by weight) in a weight ratio of 3:1 and then a self-produced solid component having a composition as stated in Table 1 was added and mixed in thoroughly. The 0.12-3.2 mm sand in this measurement series was CS sand (copper slag). The weight ratio of component A to component B to solid component is stated in Table 3. The mixed grouting mortar was in each case poured into molds of 13×13×25 mm (width, height, length), shaken on a vibrating table for 1 minute, and stored in the formwork at 20° C. for 24 hours. After stripping, a virtually slag-free epoxy resin layer, assessed with the naked eye, was observed on the upper side of the test specimens and the thickness thereof was determined. The thickness of this layer and the content of fillers and slag in the grouting mortars are stated in Table 3.

TABLE 3

|  | Ex. 8 M-9 | Ex. 9 M-10 | Ex. 10 M-11 | Ex. 11 M-12 | Ex. 12 M-13 |
|---|---|---|---|---|---|
| Parts by weight in the grouting mortar |  |  |  |  |  |
| Component A | 3 | 3 | 3 | 3 | 3 |
| Component B | 1 | 1 | 1 | 1 | 1 |
| Solid component | 16 | 30 | 34 | 38 | 46 |
| % by weight of solid component in the grouting mortar | 80 | 88 | 89 | 90 | 92 |
| % by weight of slag in the grouting mortar | 59 | 65 | 66 | 67 | 68 |
| Thickness of the slag-free epoxy resin layer on the upper side of the test specimen (in % of the total height of the test specimen) | 28 | 15 | 11 | 5 | 3 |

Compressive Strength of Grouting Mortars Having Varying Proportions of Epoxy Resin and Curing Agent Epoxy resin (produced from 60 parts by mass of Araldite GY 250, 20 parts by mass of F-resin, 15 parts by mass of 1,4-butane diglycidyl ether, 5 parts by mass of C12/C14 alkyl glycidyl ether) was mixed thoroughly with the curing agent (produced from 55 parts by mass of triethylenetramine, 10 parts by mass of polyaminoamide adduct—having 115 g/equiv of H-active equivalents and approx. 270 mg KOH/g amine value—and 5 parts by mass of tris-2,4, 6-dimethylaminomethylphenol) in the amounts stated in Tables 4 and 5. EFS and PCE were then added in the amounts shown in Tables 4 and 5 and mixed in thoroughly.

To produce the test specimens, the mixed grouting mortar was poured into steel molds. The flowability was assessed on a scale from 1 to 5, where 1 means not flowable and 5 means excellent flowability. The test specimens were stored in the formwork at 20° C. for 24 hours. The test specimens were then removed from the formwork and stored further at 20° C. After storage for 7 days, the compressive strength was determined.

TABLE 4

|  | Ex 13 M-14 | Ex 14 M-15 | Ex 15 M-16 | Ex 16 M-17 | Ex 17 M-18 | Ex 18 M-19 |
| --- | --- | --- | --- | --- | --- | --- |
| EFS 0.12-3.2 mm | 29.88 | 29.88 | 29.88 | 29.88 | 29.88 | 29.88 |
| PCE solution* | 0.12 | 0.12 | 0.12 | 0.12 | 0.12 | 0.12 |
| Epoxy resin | 1.18 | 1.82 | 5.61 | 2.86 | 7.48 | 10.24 |
| Curing agent | 0.27 | 0.42 | 1.31 | 0.66 | 1.74 | 2.38 |
| Flowability | 1 | 1 | 4 | 2 | 5 | 5 |
| Compressive strength [MPa] | 7.15 | 19.9 | 87.1 | 31.2 | 87.7 | 85.4 |

*20% by weight of polycarboxylate ether dissolved in 80% by weight of benzyl alcohol

TABLE 5

|  | Ex 19 M-20 | Ex 20 M-21 | Ex 21 M-22 | Ex 22 M-23 | Ex 23 M-24 | Ref. 24 M-25 |
| --- | --- | --- | --- | --- | --- | --- |
| CS 0.12-3.2 mm | 29.88 | 29.88 | 29.88 | 29.88 | 29.88 | 29.88 |
| PCE solution* | 0.12 | 0.12 | 0.12 | 0.12 | 0.12 | 0.12 |
| Epoxy resin | 1.18 | 1.82 | 5.61 | 2.86 | 7.48 | 10.24 |
| Curing agent | 0.27 | 0.42 | 1.31 | 0.66 | 1.74 | 2.38 |
| Flowability | 1 | 1 | 5 | 2 | 5 | 5 |
| Compressive strength [MPa] | 25.2 | 44.2 | 75.4 | 66.6 | 69.8 | 64.6 |

*20% by weight of polycarboxylate ether dissolved in 80% by weight of benzyl alcohol Compressive Strength of Grouting Mortars Having Varying Proportions of Polyurethane Resin Polyurethane resin (PUR; produced by mixing 55 parts by mass of Setathane 1150, 3.5 parts by mass of Desmophen T 4011, 17.3 parts by mass of hydroxy-terminated polybutadiene polyol, 13.8 parts by mass of ethylhexane-1,3-diol, 10 parts by mass of Sylosiv A3, 0.1 parts by mass of Zr catalyst K-Kat A-209) was mixed thoroughly with Desmodur VL in the amounts stated in Tables 6 and 7. EFS, the mixture of limestone and baryte (see Table 1), and PCE were then added in the amounts shown in Tables 6 and 7 and mixed in thoroughly. To produce the test specimens, the mixed grouting mortar was poured into steel molds. The flowability was assessed on a scale from 1 to 5, where 1 means not flowable and 5 means excellent flowability. The test specimens were stored in the formwork at 20° C. for 24 hours. The test specimens were then removed from the formwork and stored further at 20° C. After storage for 7 days, the compressive strength was determined.

TABLE 6

|  | Ex 25 M-26 | Ex 26 M-27 | Ex 27 M-28 | Ex 28 M-29 |
| --- | --- | --- | --- | --- |
| EFS 0.12-3.2 mm | 25.4 | 25.05 | 25.05 | 25.72 |
| Mixture of limestone powder and baryte powder, <0.1 mm | 4.48 | 4.83 | 4.83 | 4.16 |
| PCE solution* | 0.12 | 0.12 | 0.12 | 0.12 |
| PUR | 1.16 | 4.57 | 0.62 | 2.60 |
| Desmodur VL | 0.74 | 2.92 | 0.40 | 1.66 |
| Flowability | 1 | 3 | 2 | 2 |
| Compressive strength [MPa] | 18.3 | 31.9 | 38.3 | 33.8 |

*20% by weight of polycarboxylate ether dissolved in 80% by weight of benzyl alcohol

TABLE 7

|  | Ex 29 M-26 | Ex 30 M-27 | Ex 31 M-28 | Ex 32 M-29 |
| --- | --- | --- | --- | --- |
| CS 0.12-3.2 mm | 25.4 | 25.05 | 25.05 | 25.72 |
| Mixture of limestone powder and baryte powder, <0.1 mm | 4.48 | 4.83 | 4.83 | 4.16 |
| PCE solution* | 0.12 | 0.12 | 0.12 | 0.12 |
| PUR | 1.16 | 4.57 | 0.62 | 2.60 |
| Desmodur VL | 0.74 | 2.92 | 0.40 | 1.66 |
| Flowability | 1 | 2 | 1 | 1 |
| Compressive strength [MPa] | 36.6 | 40.7 | 42.1 | 55.0 |

*20% by weight of polycarboxylate ether dissolved in 80% by weight of benzyl alcohol

The invention claimed is:

1. A method comprising
a step of grouting of machines or turbines with a curable binder composition comprising: a) at least one organic binder selected from the group consisting of a1) epoxy resins and curing agents for epoxy resins and a2) polyisocyanates and polyols, and b) at least 50% by weight of slag based on 100% by weight of the binder composition,
wherein the slag has a bulk density of at least 2.9 kg/l, and
wherein the slag is an iron-containing slag containing at least 8% by weight, of iron, calculated as FeO.

2. The method as claimed in claim 1, wherein the binder composition contains 50% to 80% by weight, of slag, based on 100% by weight of the binder composition.

3. The method as claimed in claim 1, wherein the slag is selected from the group consisting of blast furnace slags, steel slags, metallurgical slags, and slags from waste incineration.

4. The method as claimed in claim 1, the slag has a particle size of 0.05 to 16 mm.

5. The method as claimed in claim 1, wherein the slag particles are irregularly shaped and/or have a rough surface.

6. The method as claimed in claim 1, wherein at least one further mineral filler selected from the group consisting of limestone powder, chalk, quartz powder, silica dust, titanium dioxide, baryte powder, and alumina is additionally present in the curable binder composition.

7. The method as claimed in claim 1, wherein at least one wetting agent and/or dispersant, is present in the curable binder composition.

8. The method as claimed in claim 7, wherein the slag and optionally also the at least one further filler, if present, are coated with the wetting agent and/or dispersant.

9. The method as claimed in claim 1, wherein the curable binder composition is a multicomponent system comprising at least one resin component comprising at least one epoxy resin, and at least one curing agent component comprising at least one curing agent for epoxy resins, wherein slag and optionally further ingredients are present in the resin components, in the curing agent components and/or in any further components optionally present.

10. The method as claimed in claim 1, wherein the curable binder composition is a multicomponent system comprising at least one polyisocyanate component comprising at least one polyisocyanate, and at least one polyol component comprising at least one polyol, wherein slag and optionally further ingredients are present in the polyisocyanate components, in the polyol components and/or in any further components optionally present.

* * * * *